United States Patent [19]

Hager et al.

[11] Patent Number: 4,747,994

[45] Date of Patent: May 31, 1988

[54] REACTOR TRIP CONTROL WITH VOLTAGE SENSING

[75] Inventors: Robert E. Hager, Penn Hills; Jerzy Gutman, Plum Borough, both of Pa.

[73] Assignee: Westinghouse Electric Corp., Pittsburgh, Pa.

[21] Appl. No.: 40,696

[22] Filed: Apr. 20, 1987

Related U.S. Application Data

[63] Continuation of Ser. No. 789,252, Oct. 18, 1985.

[51] Int. Cl.⁴ .............................................. G21C 7/36
[52] U.S. Cl. ................................... 376/215; 364/481; 364/492
[58] Field of Search ................. 376/215, 216; 364/481, 364/492, 68, 96

[56] References Cited

U.S. PATENT DOCUMENTS

| | | | |
|---|---|---|---|
| 4,338,647 | 7/1982 | Wilson | 364/481 |
| 4,427,620 | 1/1984 | Cook | 376/216 |
| 4,603,367 | 7/1986 | Müller | 361/98 |

FOREIGN PATENT DOCUMENTS

| | | |
|---|---|---|
| 0136254 | 4/1985 | European Pat. Off. |
| 1069093 | 5/1967 | United Kingdom . |
| 1548745 | 7/1979 | United Kingdom . |
| 2095058A | 9/1982 | United Kingdom . |

Primary Examiner—Donald P. Walsh
Attorney, Agent, or Firm—D. C. Abeles

[57] ABSTRACT

A control system for a trip coil in a switchgear mechanism which controls the supply of power to a process control device and ensures de-energization of the trip coil shortly after the trip coil is energized. A transformer is supplied with power by the switchgear and outputs reduced power to a rectifier which is connected to the trip coil via a trip activation device. The output of the rectifier can be monitored to determine the ability of the control system to activate the trip coil and the condition of the power supplied to the process control device.

14 Claims, 2 Drawing Sheets

REACTOR TRIP CONTROL WITH VOLTAGE SENSING

BACKGROUND OF THE INVENTION

1. Field of the Invention

The present invention relates in general to the control of switchgear mechanisms which supply power to process control apparatuses, and more specifically to the control of reactor trips in a pressurized light water nuclear reactor, including sensing the condition of power supplied to devices which position control rods in the reactor.

2. Description of the Related Art

The most important step in the shutting down of a nuclear reactor is the insertion of control rods into the reator core. Conventionally, the control rods in a pressurized light water nuclear reactor are positioned by spring-loaded mechanical grippers which hold the control rods only while supplied with electrical power. When the power is cut off, the mechanical grippers release the control rods which fall into the reactor under the force of gravity.

A switchgear mechanism is connected to the power supply line for the rod positioning grippers to interrupt the supply of power when an unsafe condition is sensed by the reactor control and protection systems. Typically, the rod positioners are supplied with alternating current (AC) power at 480 volts. Conventional switchgear mechanisms utilize low resistance, direct current (DC) shunt trip coils which respond quickly but require that the power supplied thereto be cut off shortly after activation of the switchgear to prevent overheating and resultant burnout of the shunt trip coils. Conventionally the trip coil is powered by a DC battery which supplies, e.g., 125 volts under the control of a manually or automatically activated switch. Auxiliary contacts on the switchgear are connected in series with the battery and trip coil to break the circuit between the battery and trip coil after the shunt trip coil is activated. Thus, de-energization of the shunt trip coil conventionally depends upon the mechanical operation of the switchgear, which can be tested only by activation of the switchgear.

SUMMARY OF THE INVENTION

An object of the present invention is to eliminate the use of an externally supplied DC power to activate a trip coil in switchgear to control reactor trips in a pressurized light water nuclear reactor.

Another object of the present invention is to ensure deactivation of a trip coil in switchgear controlling the supply of power to a process control device.

A further object of the present invention is to provide electrical isolation of a power condition signal generated by a control system which controls the supply of power to a process control device.

Yet another object of the present invention is to provide a control system which controls and monitors the condition of power supplied to a process control device.

The above-mentioned objects are obtained by providing a control system for a trip coil in switchgear receiving power at a first level from a power source and supplying the power at the first level to a process control device. The control system includes a transformer, supplied with power by the switchgear, for reducing the power from the first level to a second level and a trip device for supplying the power at the second level to the trip coil of the switchgear only when interruption of the power supplied to the process control device is desired. A control system according to the present invention may include a voltage/optical converter for converting the power at the second level to a light signal and an optical transmitter for transmitting the light signal to a monitoring device.

These objects, together with other objects and advantages which will be subsequently apparent, reside in the details of construction and operation as more fully hererinafter described and claimed, reference being had to the accompanying drawings forming a part hereof, wherein like reference numerals refer to like parts throughout.

DESCRIPTION OF THE PREFERRED EMBODIMENTS

Figure 1:
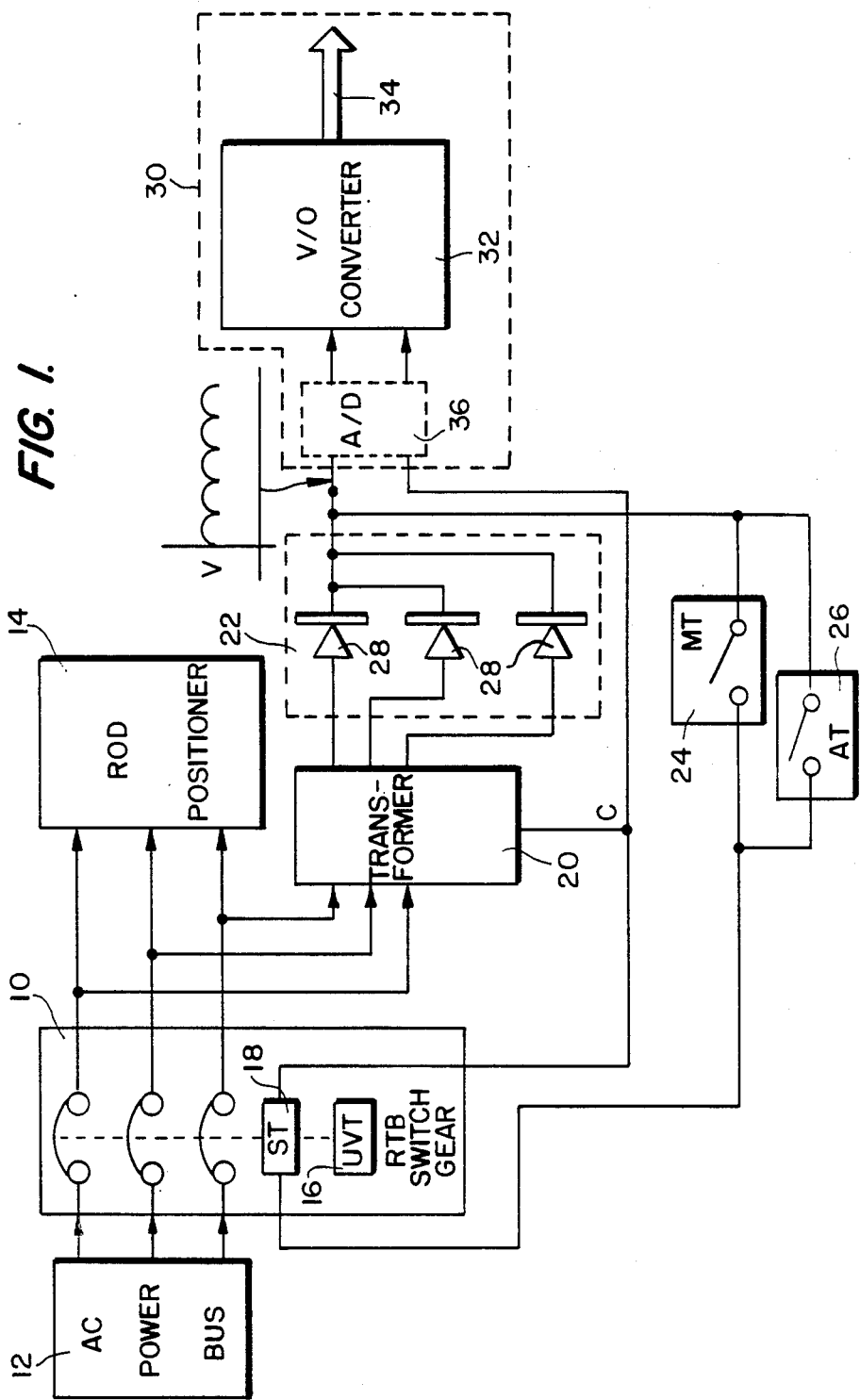
FIG. 1 is a block diagram of an embodiment of the present invention which generates a light signal indicating the condition of electrical power supplied to a process control device such as a rod positioner.

An embodiment of the present invention is illustrated in FIG. 1 which utilizes a switchgear mechanism 10 as a reactor trip breaker RTB. The switchgear mechanism 10 receives power from an AC power bus 12 in a reactor control system and supplies power to a rod positioner 14 which controls the position of control rods in a pressurized light water nuclear reactor. The switchgear 10 can be a conventional switchgear mechanism, such as Westinghouse Part No. DS206 or DS416. Such a switchgear mechanism 10 conventionally includes an undervoltage trip coil 16 which is de-energized while the shunt trip coil 18 is energized, when an undesirable condition is detected in the nuclear reactor.

According to the present invention, the shunt trip coil 18 in the switchgear 10 is provided power via a potential transformer 20, such as a Westinghouse type PXA, style No. 592A781G0A, and a rectifier 22 which may comprise diodes 28, each diode may be a 1N3990, available from Westinghouse Electric Corporation. The shunt trip coil 18 is energized by activation of either a manual trip switch 24 or an automatic trip switch 26 connected to an automatic protection system. Since the potential transformer 20 is supplied with power by the switchgear 10, when the shunt trip coil 18 is energized to interrupt the supply of power to the rod positioner 14, the supply of power to the potential transformer 20 is also interrupted, thereby de-energizing the shunt trip coil 18. The rectifier 22 outputs a DC voltage which can be monitored to determine the ability of the trip coil control system to activate the shunt trip coil 18 and the condition of the power supplied to the rod positioner 14. The DC voltage will have a ripple, as illustrated in FIG. 1, if just three diodes 28 are used in the rectifier 22.

One embodiment of the present invention includes a power monitoring device 30 to monitor the DC voltage output by the rectifier 22. The power monitoring device 30 comprises a voltage/optical converter 32, such as a Hewlett-Packard # HFBR-1201, which provides isolation between the trip coil control system and monitoring devices in the reactor control system. The voltage/optical converter 32 outputs a light signal which can be tranmitted over an optical cable 34, such as a Hewlett-Packard # HFBR-300. The light signal generated by a simple voltage/optical converter 32 is sufficient to transmit information regarding whether the rectifier 22 is outputting a DC voltage and further provides an indication regarding the condition of the power supply to the rod positioner 14, such as missing phases in the AC power. If additional information, such as voltage level, is desired, an analog/digital converter 36 can be added to the monitoring device 30.

Figure 2:
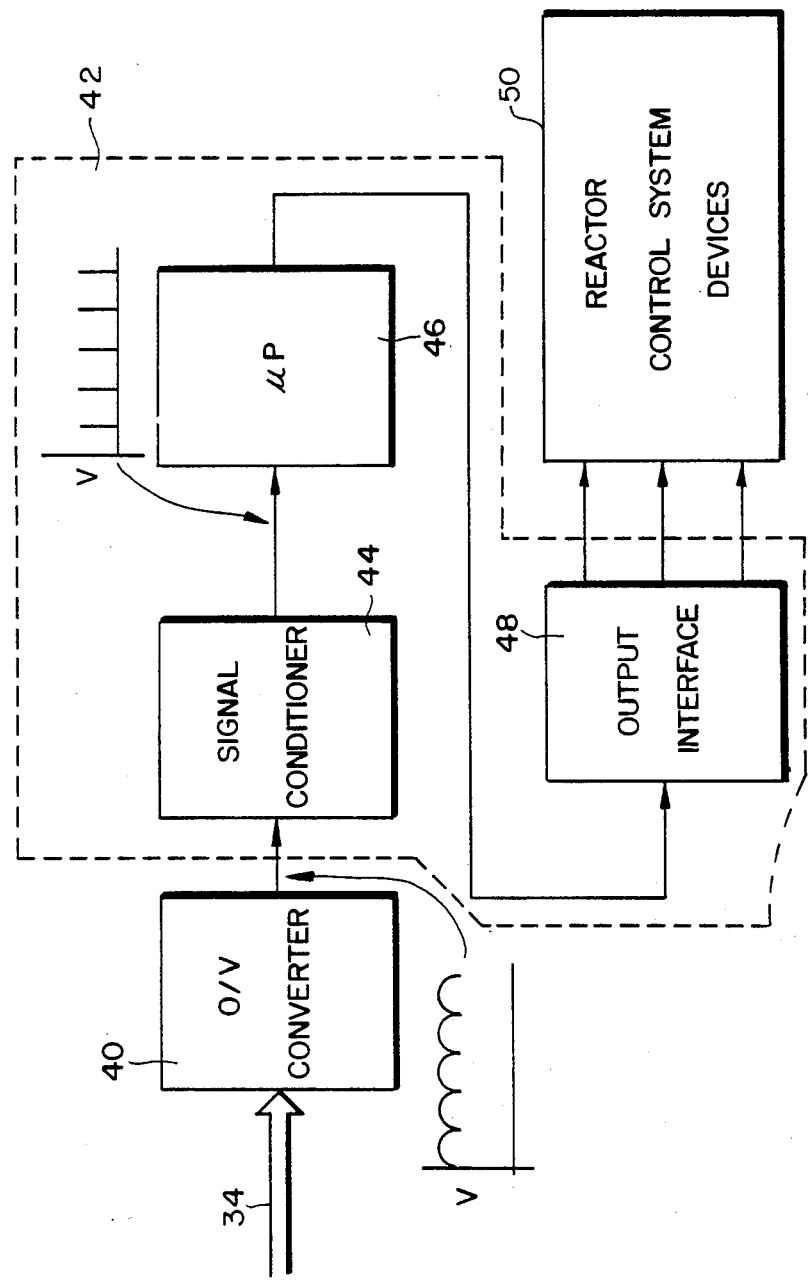
FIG. 2 is a block diagram of a monitoring system which receives the light signal from the control system illustrated in FIG. 1.

The monitoring device 30 may also include additional components at a remote distance from the switchgear 10. Such components are illustrated in FIG. 2 as receiving the light signal via the optical cable 34. An optical/voltage converter 40, such as a Hewlett-Packard # HFBR-2201, converts the light signal back into a DC voltage which is supplied to a microprocessor board 42, such as an Intel 88/40. The microprocessor board 42 includes a signal conditioner 44, microprocessor 46 and an output interface 48 for interfacing with other devices 50 in the reactor control system.

Each reactor trip breaker 10 in a conventional reactor control system may be connected to several signal processing units such as the microprocessor board 42 illustrated in FIG. 2. With the addition of more voltage optical voltage/converters 32 to receive the output of the rectifier 22, several microprocessor boards 42 can be connected to monitor a single reactor trip breaker 10.

The many features and advantages of the present invention are apparent from the detailed specification, and thus it is intended by the appended claims to cover all such features and advantages of the control system which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope and spirit of the invention.

What is claimed is:

1. A control system for a trip coil in switchgear, the switchgear receiving power at a first level from a power source and supplying the power at the first level to a process control device, said control system comprising:
   voltage reduction means, supplied with power by the switchgear, for reducing the power from the first level to a second level; and
   trip means, for supplying the power at the second level to the trip coil of the switchgear only when interruption of the power supplied to the process control device is desired, said voltage reduction means ending the supplying of power at the second level when the power supplied to the process control device is interrupted.

2. A control system as recited in claim 1,
   wherein the power has alternating current, and
   wherein said voltage reduction means comprises:
      a potential transformer, operatively connected to the switchgear, for reducing the power from the first level to the second level; and
      rectifier means, operatively connected to said potential transformer and said trip means, for converting the power into a direct current voltage.

3. A control system as recited in claim 1, further comprising power monitoring means for monitoring the power that the switchgear supplies by monitoring the power at the second level output by said voltage reduction means.

4. A control system as recited in claim 3,
   wherein the power has alternating current, and
   wherein said voltage reduction means comprises:
      a potential transformer, operatively connected to the switchgear, for reducing the power from the first level to the second level; and
   rectifier means, operatively connected to said potential transformer, said trip means and said power monitoring means, for converting the power into a direct current voltage.

5. A control system as recited in claim 4, wherein said power monitoring means, comprises:
   voltage/optical converter means for converting the direct current voltage into a light signal; and
   optical transmission means for transmitting the light signal.

6. A control system as recited in claim 5, wherein said power monitoring means further comprises:
   optical/voltage converter means, operatively connected to said optical transmission means, for converting the light signal into a monitored voltage signal; and
   process means for monitoring the monitored voltage signal.

7. A control system as recited in claim 6, wherein said power monitoring means further comprises an analog/digital converter, operatively connected to said rectifier means and said voltage/optical converter means, for detecting a voltage level of the power supplied to the trip coil of the switchgear.

8. A method for supplying power to a trip coil in switchgear, the switchgear receiving power at a first voltage level from a power source and supplying the power at the first voltage level to a process control device, said method comprising the steps of:
   (a) reducing the power supplied by the switchgear from the first voltage level to a second voltage level;
   (b) supplying the power at the second voltage level to the trip coil of the switchgear only when interruption of the power supplied to the process control device is desired; and
   (c) ending said supplying of power at the second level in step (b) when the power supplied to the process control device has been interrupted.

9. A method as recited in claim 8, further comprising the step of (a) monitoring the second voltage level.

10. A control system for a trip coil in switchgear, the switchgear receiving alternating current power at a first voltage level from a power source and supplying the alternating current power at the first voltage level to a rod positioner for control rods in a pressurized light water nuclear reactor, said control system comprising:
   a potential transformer, operatively connected to the switchgear to receive the alternating current power at the first voltage level, for reducing the first voltage level to a second voltage level;
   rectifier means, operatively connected to said potential transformer, for converting the alternating current power at the second voltage level to a first direct current voltage;
   trip means, operatively connected to said rectifier means and the trip coil in the switchgear, for supplying the first direct current voltage to the trip coil of the switchgear only when interruption of the alternating current power supplied to the rod positioner is desired, said rectifier means ending the supplying of the first direct current voltage when the alternating current supplied to the rod positioner is interrupted;

voltage/optical converter means, operatively connected to said rectifier means, for converting the first direct current voltage into a light signal indicating the second voltage level; and optical transmission means, operatively connected to said voltage/optical converter means, for transmitting the light signal.

11. A control system as recited in claim 10,
wherein said control system is operatively connected to an automatic protection system, and
wherein said trip means comprises:

manual trip activation means, operatively connected to said rectifier means and the trip coil in the switchgear, for manually interrupting the supply of the alternating current power to the rod positioner; and automatic trip activation means, operatively connected to said rectifier means, the trip coil in the switchgear and the automatic protection system, for automatically interrupting the supply of the alternating current power to the rod positioner under control of the automatic protection system.

12. A control system as recited in claim 10, further comprising an analog/digital converter, operatively connected to said voltage/optical converter means, for detecting a voltage level of the power supplied to the trip coil of the switchgear.

13. A control system as recited in claim 10, further comprising:

optical/voltage converter means, operatively connected to said optical transmission means, for converting the light signal into a second direct current voltage; and processor means, operatively connected to said optical/voltage converter means, for monitoring the second direct current voltage.

14. A control system as recited in claim 13, further comprising an analog/digital converter, operatively connected to said rectifier means and said voltage/optical converter means, for detecting a voltage level of the power supplied to the trip coil of the switchgear.

* * * * *